US011378310B2

(12) United States Patent
Watson et al.

(10) Patent No.: US 11,378,310 B2
(45) Date of Patent: Jul. 5, 2022

(54) DYNAMICALLY ADAPTIVE COMBINED HEAT AND POWER SYSTEM WITH A THERMAL ENERGY STORE AND METHOD THEREOF

(71) Applicant: DEKATO TECHNOLOGY LIMITED, Leeds (GB)

(72) Inventors: Darren Watson, Leeds (GB); David Clancy, Glanmire (IE)

(73) Assignee: Dekato Technology Limited, Leeds (GB)

( * ) Notice: Subject to any disclaimer, the term of this patent is extended or adjusted under 35 U.S.C. 154(b) by 87 days.

(21) Appl. No.: 16/470,712

(22) PCT Filed: Dec. 4, 2017

(86) PCT No.: PCT/GB2017/053648
§ 371 (c)(1),
(2) Date: Jun. 18, 2019

(87) PCT Pub. No.: WO2018/115812
PCT Pub. Date: Jun. 28, 2018

(65) Prior Publication Data
US 2020/0088450 A1  Mar. 19, 2020

(30) Foreign Application Priority Data
Dec. 20, 2016  (GB) ..................... 1621772

(51) Int. Cl.
*F25B 27/02* (2006.01)
*F02G 5/02* (2006.01)
(Continued)

(52) U.S. Cl.
CPC ................ *F25B 27/02* (2013.01); *F02G 5/02* (2013.01); *F24D 5/12* (2013.01); *F24D 11/0235* (2013.01);
(Continued)

(58) Field of Classification Search
CPC ........ F02G 5/02; F24D 11/0235; F25B 27/02; Y02A 30/274; Y02B 30/52; Y02P 80/15
See application file for complete search history.

(56) References Cited

U.S. PATENT DOCUMENTS

2007/0217866 A1\* 9/2007 Oscar .................. B65D 88/022
  405/36
2017/0089625 A1\* 3/2017 Wallace ................ F25B 49/027
(Continued)

FOREIGN PATENT DOCUMENTS

DE      19740398 A1    3/1999
DE      197 40 398   \*  9/1999
(Continued)

OTHER PUBLICATIONS

UK Intellectual Property Office Search Report, Application No. GB1621772.1, dated May 3, 2017, United Kingdom.
(Continued)

*Primary Examiner* — Henry T Crenshaw
(74) *Attorney, Agent, or Firm* — Troutman Pepper Hamilton Sanders LLP

(57) ABSTRACT

The present invention provides for a combined heat and power system including at least one engine, operatively coupled to a generator, having at least one first heat source adapted to provide a first thermal energy output at a first temperature range, and at least one second heat source adapted to provide a second thermal energy output at a second temperature range, at least one first heat exchanger, operatively coupled to said at least one engine, and adapted to selectively receive and transfer at least a portion of any one or all of said first thermal energy output and said at least one second thermal energy output; and a dynamically adaptive heat storage system.

17 Claims, 13 Drawing Sheets

(51) Int. Cl.
  *F24D 5/12*      (2006.01)
  *F24D 11/02*     (2006.01)
  *F25B 25/00*     (2006.01)
  *F25B 49/02*     (2006.01)

(52) U.S. Cl.
  CPC ............ *F25B 25/005* (2013.01); *F25B 49/02* (2013.01); *F24D 2200/26* (2013.01); *F24H 2240/06* (2013.01)

(56) References Cited

U.S. PATENT DOCUMENTS

2017/0234559 A1* 8/2017 Federspiel ............. G06Q 50/06
                                                    700/278
2017/0336085 A1* 11/2017 Yasuo ..................... F25B 13/00

FOREIGN PATENT DOCUMENTS

| DE | 102013006814 A1 | 10/2014 |
|---|---|---|
| EP | 1628091 A2 | 2/2006 |
| JP | H04124594 A | 4/1992 |
| WO | 2016051246 A1 | 4/2016 |

OTHER PUBLICATIONS

International Search Report and Written Opinion from corresponding International Application No. PCT/GB2017/053648 dated Feb. 28, 2018.

* cited by examiner

DYNAMICALLY ADAPTIVE COMBINED HEAT AND POWER SYSTEM WITH A THERMAL ENERGY STORE AND METHOD THEREOF

This application is a 371 of PCT/GB2017/053648, filed Dec. 4, 2017, which claims priority to GB Serial No. 1621772.1, filed Dec. 20, 2016, each of which are hereby incorporated by reference.

The present invention generally relates to energy conversion systems and, in particular, to combined heat and power energy systems including thermal energy storage systems.

INTRODUCTION

Engines of various types that may use a fuel to generate power and produce heat as a by-product are commonly used in a variety of combined heat and power systems (CHP), also known as cogeneration systems. FIG. 1 shows a schematic illustration of a typical arrangement for such a combined heat and power (CHP) system 10. Here, one or more piston engine(s) 12 are supplied with a stream of air 14 and fuel 16. The engines 12 are operatively coupled to one or more electrical generators 18. Exhaust gases 20 are discharged from the engine(s) 12, usually at a high temperature (typically >400° C.), and are provided to a heat recovery unit 22 (e.g. heat exchanger). In the heat recovery unit 22, a proportion of the comprised heat energy is removed from the exhaust gases 20, thereby cooling the exhaust gases 20 before they are rejected, for example, via a flue, stack or chimney system 24 to the atmosphere. Any heat recovered from the exhaust gases 20 is transferred to an auxiliary fluid 26, such as water, and supplied to one or more secondary systems or processes 28. The secondary systems or processes 28 may be, for example, one or more large buildings, a campus, an industrial process or any other processes that utilises heat energy. The auxiliary fluid 26 may be circulated via suitable fluid circuit by one or more fluid pumps 30. In this particular example of a typical combined heat and power (CHP) system 10, the secondary system or processes 28 remove required heat energy and return the auxiliary fluid 26 back to the combined heat and power (CHP) system 10.

The engines 12 of a CHP system 10 may also provide a useful source of medium temperature or medium-grade heat (typically 70° C. to 110° C.) 32 that can be transferred to an auxiliary fluid 26 (e.g. water) in a number of ways. This medium temperature heat 32 may be derived, for example, from the engine jacket, so as to contribute to the total thermal energy available to secondary systems 28 (e.g. campus), but there can also be instances where the medium temperature (medium-grade) heat must be rejected. Such heat rejection may be achieved partially or in full using an auxiliary cooler 34. Furthermore, a control valve arrangement 36 such as shown in FIG. 1 may be implemented to create partial or full re-circulation of the auxiliary fluid 26 that is then cooled by the auxiliary cooler 34, e.g. a fin-fan cooler or any other suitable cooling device. The engines 12 of the CHP system 10 may also provide relatively low temperature or low-grade heat (typically 30° C. to 70° C.) 38, which in most conventional cases is not suitable for recovery and use in the secondary systems or processes 28. There may be instances where such low-grade heat is theoretically suitable for direct use in a facility, however, practical limitations associated with the cost or complexity of using such low temperature heat (also referred to as low-quality heat) prevent its use. As a result, low temperature heat from engines 12 in most prior art systems is generally rejected using, inter alia, an auxiliary cooler 34, such as, for example, a fin fan cooler or any other equivalent cooling device.

The proportions of heat and power generated and needed in a CHP system is also known as 'heat-to-power ratio'. The heat-to-power ratio achieved by a CHP system is usually a good measure of its suitability for a specific application or facility based on the thermodynamic match with the system or process requirements. A big factor of the thermodynamic match is the type of engine 12 selected for the combined heat and power (CHP) system 10. Additional fuel 40 and air 42 may be supplied to the heat recovery unit 22 and combusted (also known as 'supplementary firing'), in order to selectively increase the portion of heat in the heat-to-power ratio that is available to the secondary system or processes 28, when needed. Additional heat may also be provided by added boilers operating in parallel.

It is known that the fuel efficiency of such prior art CHP systems 10 can be as high as 95%, but only when the secondary system or processes 28 has a requirement for heat energy that matches or exceeds the non-supplementary fired heat output of the combined heat and power (CHP) system 10.

For example, there are times, when the heat produced by the CHP system 10 can exceed the secondary system and processes 28 requirement for heat at a particular point in time. Therefore, a heat store of some description may be used to accumulate or store that heat energy for a later use. However, the size and capacity of the conventional heat store that is necessary to optimise a typical CHP system 10 can be very large and may therefore not be achieved for practical or economic reasons.

In addition, irrespective of the type and selection of the engine 12 or capacity (e.g. size) of the thermal store, the efficiency of a conventional CHP system 10 is unlikely to exceed more than about 95%, even in winter when demand for heat is usually high. In summer, when the demand for heat is significantly reduced, the efficiency of a conventional CHP system 10 is likely to be relatively low. Consequently, over a time period of a typical year, the average efficiency for a CHP system 10 will therefore be much lower than the maximum achievable efficiency during winter. Variations in the demand for heat and power as described can also present challenges to achieving optimum efficiency during a typical day, if high and low demand in heat and power is experienced at different times.

To somehow improve the overall efficiency, there have been proposals for alternative CHP systems that utilise heat pump technologies. Typical examples include CHP systems where the engine is used as a mechanical drive for a compressor of the heat pump, so that the heat pump provides heat energy to a facility, secondary system or processes 28. Other example CHP systems may also include thermal integration of some or part of the engine heat output in combination with a heat pump, so as to supply heat to a facility, secondary system or processes. Furthermore, CHP plants have been proposed that enable the heat pumps to be reversed, so as to optionally act as chiller providing cooling when required (e.g. in warm summer periods).

However, none of the currently available CHP systems fully allows for adaptively optimising its overall efficiency to existing weather conditions and consumer demands, as well as, the economic characteristics of the energy market.

Accordingly, it is an object of the present invention to provide an improved combined heat and power (CHP) system and method suitable to overcome at least some of the limitations of the current prior art. In particular, it is an object of the present invention to provide a dynamically adaptive CHP system and method, so as to improve, inter alia, overall fuel efficiency, heat-to-power ratio, energy supply response time and load flexibility.

SUMMARY OF THE INVENTION

Preferred embodiment(s) of the invention seek to overcome one or more of the disadvantages of the prior art.

According to a first embodiment of the invention, there is provided a combined heat and power system, comprising:
- at least one engine, operatively coupled to a generator, having at least one first heat source adapted to provide a first thermal energy output at a first temperature range, and at least one second heat source adapted to provide a second thermal energy output at a second temperature range;
- at least one first heat exchanger, operatively coupled to said at least one engine, and adapted to selectively receive and transfer at least a portion of any one or all of said first thermal energy output and said at least one second thermal energy output, and
- a dynamically adaptive heat storage system, comprising:
  - a selectively variable first thermal energy store, adapted to accept, store and discharge thermal energy at said first temperature range;
  - at least one selectively variable second thermal energy store, adapted to accept, store and discharge thermal energy at said second temperature range;
  - at least one first heat pump, operatively coupled to said first thermal energy store and said at least one second thermal energy store, and which is adapted to transfer and thermally upgrade the thermal energy stored in said at least one second thermal energy store to said first thermal energy store, and
  - a system controller, adapted to selectively engage any one or all of said at least one first heat source and said at least one second heat source and control the amount of thermal energy that is stored, upgraded or discharged, so as to optimise the energy efficiency of said combined heat and power system.

The combined heat and power system according to the present invention provides the advantage of a system that is highly adaptive to current or predicted power and thermal energy demands, as well as, predicted current energy market values, therefore optimising the overall energy and economic efficiency. In particular, the system provides the advantage of a dynamically adaptive heat storage system allowing to optimise regulation of the accumulation and supply of heat and power (i.e. balance), manually or via a suitable controller or control system, so as to optimally match the load of the system to the current demand and supply status, as well as, the economic market. Even more particularly, the dynamically adaptive system of the present invention provides the advantage of improved recovery and utilisation of not only high-grade or medium-grade heat energy, but also low-grade heat energy from a variety of internal and external sources. Furthermore, the dynamically adaptive system of the present invention is capable to not only generate, but also absorb energy from the power grid, therefore balancing its heat-to-power ratio and energy storage and supply in accordance with the economic market, predictively or in real-time, therefore, maximising its overall efficiency and cost-effectiveness.

Advantageously, said at least one engine may further comprise at least one third heat source adapted to provide a third thermal energy output at a third temperature range.

Preferably, said at least one first heat source may be a high-grade heat source, and each of said at least one second heat source and said at least one third heat source may be either a medium-grade or a high-grade heat source.

Advantageously, said system controller may further be adapted to control the amount of any one of said first thermal energy output, said second thermal energy output and said third thermal energy output that is passed directly to a consumer.

Even more advantageously, said selectively variable first thermal energy store and said selectively variable second thermal energy store may be formed by a plurality of operatively coupleable modular storage units. Preferably, the capacity of each one of said first and second thermal energy store may be selectively variable by allocating a predetermined number of said plurality of operatively coupleable modular storage units to each of said first and second thermal energy store. This provides the advantage of allowing to individually match the storage capacity of the first and second thermal energy store to the system's requirements. For example, if there is a demand for power but not all of the associated high-grade thermal energy that may be produced, and none of the low grade energy that may be produced, the capacity of the second thermal energy store can be increased to store more low-grade thermal energy. The state of the economic market may dictate such a requirement to produce electrical power when there is insufficient demand for heat so to temporarily require to store excess high-grade, medium-grade and low-grate thermal energy optimally in the first or second thermal energy store until there is sufficient consumer demand and/or a change in the economic climate.

Advantageously, the combined heat and power system may further comprise a plurality of control valves, each individually actuatable by said system controller between an open state and a closed state. Preferably, said at least one first heat exchanger may be adapted to thermally supplement or upgrade any one of said first and second thermal energy output.

Advantageously, the combined heat and power system may further comprise at least one second heat exchanger operatively coupled to and arranged downstream from said at least one first heat exchanger. Preferably, said at least one second heat exchanger may be adapted to transfer thermal energy to said at least one selectively variable second thermal energy store. Even more preferably, said at least one second heat exchanger may be operatively coupled to said at least one selectively variable second thermal energy store via a third heat exchanger. This provides the advantage of improving the energy efficiency even further by recovering low-grade thermal energy that may be rejected when recovering the high-grade thermal energy of, for example, the exhaust gases of the engine.

Advantageously, the combined heat and power system may further comprise at least one second heat pump operatively coupled to said at least one selectively variable second thermal energy store and adapted to thermally upgrade thermal energy stored in said at least one selectively variable second thermal energy store. Preferably, said at least one second heat pump may be an air-source heat pump. Even more preferably, said at least one first and second heat pump may be adapted to receive power from said generator. This improves the overall energy efficiency even further by utilising the available air-source thermal energy. Also, using excess power from the generator to drive any of the heat pumps employed within the system optimises the energy efficiency and cost effectiveness of the system.

Advantageously, said system controller may be adapted to utilise external information in order to operate said combined heat and power system and/or configure said dynamically adaptive heat storage system, so as to optimise the overall efficiency of said combined heat and power system. Preferably, said external information may comprise historical data and/or up-to-date real-time data and/or predictive data. Even more preferably, said external information may comprise any one or all of a real-time or predicted energy-demand from a consumer and real-time or predicted energy costs of the economic market.

According to a second embodiment of the invention, there is provided a method for optimising overall energy efficiency of a combined heat and power system according to the first embodiment of the invention, comprising the step of:

controlling said combined heat and power system and/or a dynamically adaptive heat storage system of said combined heat and power system, so as to optimise overall efficiency of said combined heat and power system in accordance with a predicted or real-time energy supply-and-demand state of a consumer and/or the economic market, and/or in accordance with historical, predicted or real-time energy costs.

According to a third embodiment of the invention there is provided a computer-readable storage medium having embodied thereon a computer program, when executed by a computer processor that is configured to perform the method according to the second embodiment of the present invention.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE PREFERRED EMBODIMENT(S)

The exemplary embodiments of this invention will be described in relation to a combined heat and power system having at least one engine coupled to an electric generator, so as to generate and supply electricity, as well as, thermal energy to at least one consumer, such as, for example a university campus. However, it should be appreciated that, in general, the system and method of this invention is equally applicable to any other suitable cogeneration arrangement.

For purposes of explanation, it should be appreciated that the terms 'thermal energy', 'heat' and 'heat energy' are used interchangeably throughout the description. In addition, the term 'real-time' when linked to any information or data provided from an external source is understood to mean momentarily valid, current or effective within a relatively short predetermined period of time until that information is updated. Furthermore, the terms 'heat exchanger' and 'heat recovery unit' are used interchangeably. The terms 'historical data' or 'historical information' may be understood as data or other information acquired over a predetermined time period that is prior to operating the CHP with a consumer. Furthermore, the terms 'forecast information or 'predicted data' may be understood as data or information determined for a time period that may be relevant to future operation of the CHP with a consumer. The term 'overall efficiency' of a CHP system is understood to factor in fuel efficiency, as well as, resource and running costs required to operate the CHP system. In addition, it is understood that engine types used in combined heat and power systems (CHP) may include piston engines, gas turbine engines, molten carbonate fuels cells, solid oxide fuel cells or similar technologies. Herein the term engine or engines will be used and understood to mean any suitable number or type of engine.

Figure 1:
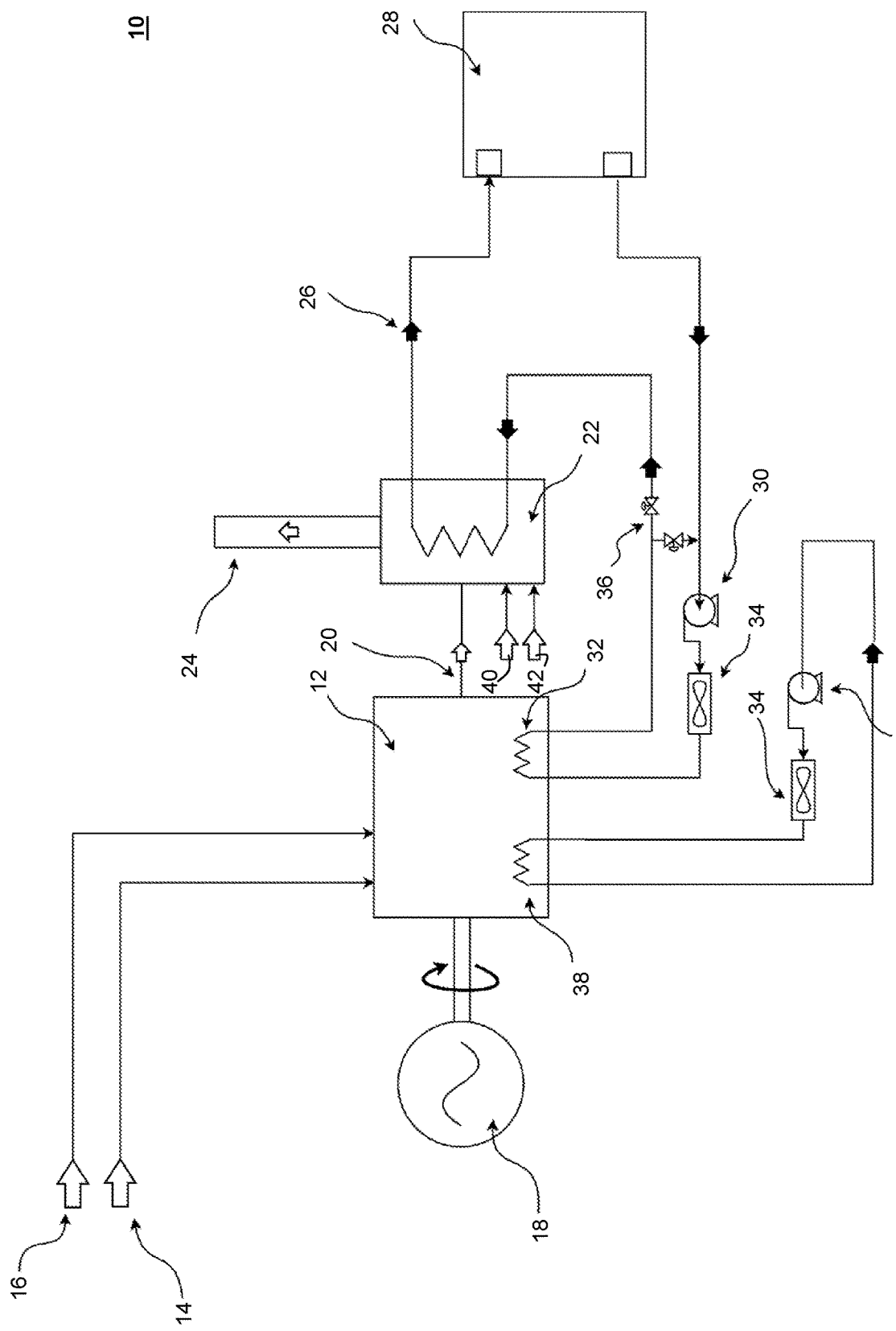
FIG. 1 shows a schematic illustration of a typical combined heat and power system (CHP) utilising a piston engine supplied with fuel and air to drive an electric generator.
Figure 2:
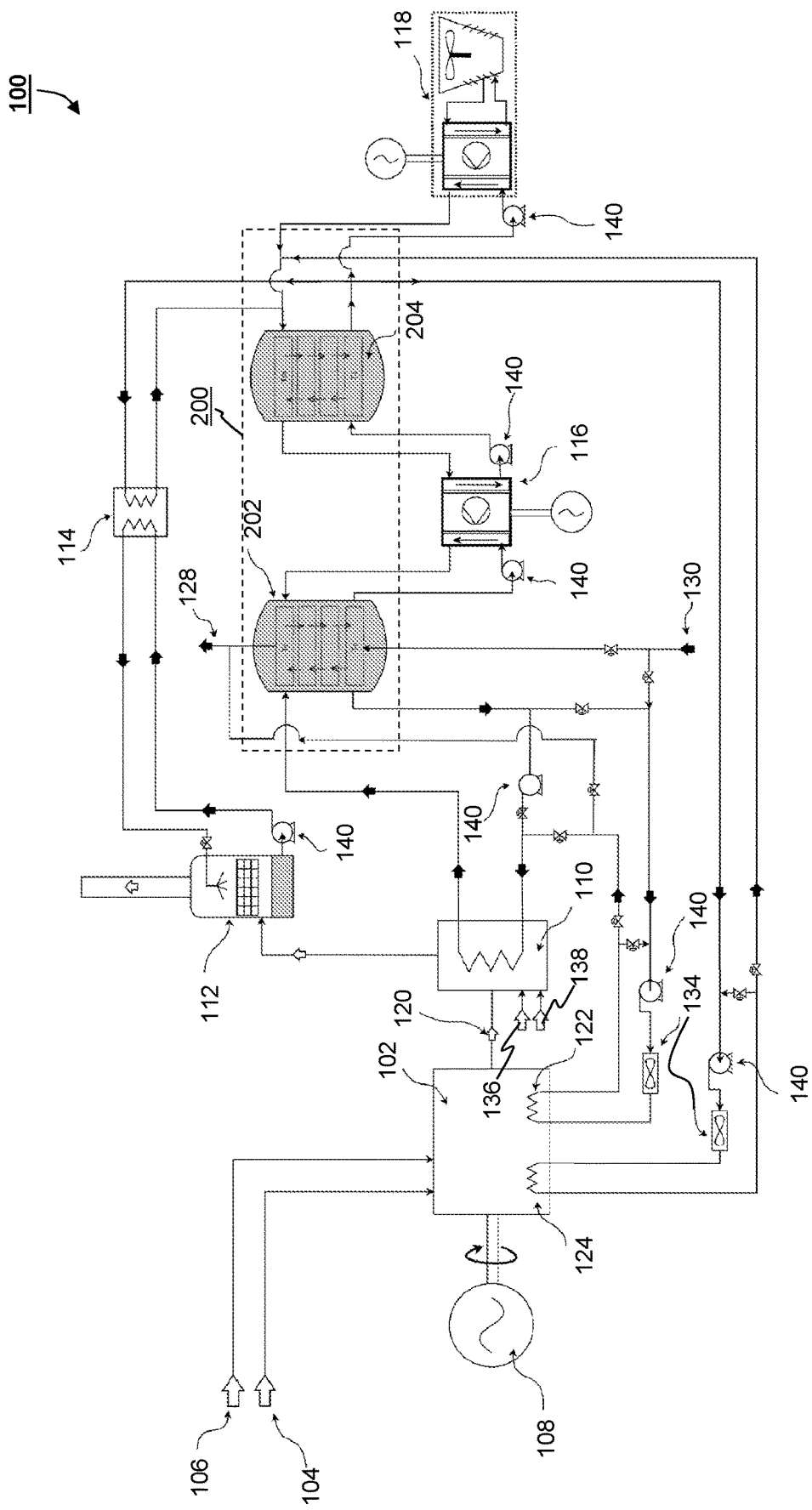
FIG. 2 shows a schematic illustration of a combined heat and power (CHP) system of the present invention including visual representation of auxiliary fluid flow (arrow) depending on the arrangement of the control valve states.

An example embodiment of the invention is shown in FIG. 2. Here, the typical arrangement of the improved combined heat and power (CHP) system 100 includes at least one engine 102 provided with a supply of air 104 and fuel 106. The engine depicted is typical of a piston engine, though, it is understood by the person skilled in the art that any suitable number or type of engine may be used. The engine 102 is operatively coupled to at least one electrical generators 108 adapted to provide a supply of electricity to a consumer or the 'grid'. A first heat exchanger 110 is operatively coupled to the engine 102 so as to allow heat generated in the engine 102 to be transferred to the first heat exchanger 110. The CHP system 100 further comprises a dynamically adaptive heat storage system 200, including at least a first and a second thermal energy store 202, 204, a second heat exchanger 112 (i.e. second heat exchanger for additional heat recovery from the exhaust at temperatures typically below 130° C.) and at least one optional third heat exchanger 114, as well as, a first heat pump 116 and a second heat pump 118. The first thermal energy store 202 is designated to receive and store high-grade and medium-grade thermal energy (i.e. heat at high to moderate temperatures), wherein the second thermal energy store 204 is designated to receive and store low-grade thermal energy (i.e. heat at low temperatures). The heat pumps 116, 118 may be any one of an air-source, water-source, ground-source heat pump, or any other heat pump suitable for exchanging thermal energy with an external energy source. The CHP system 100 comprises an auxiliary fluid circuit configured to operatively couple all active components of the CHP system 100, as well as, allow thermal energy exchange with at least one consumer.

As shown in FIG. 2, exhaust gases in streams 120 that are discharged from the engine(s) 102, usually at a high temperature (typically at temperatures of >400° C.), are fed to one or more heat recovery unit(s) 110, 112 (i.e. first and second heat exchanger), where a proportion of the available heat energy is removed from the exhaust gases, thereby cooling the exhaust gases. As is the case in embodiments of currently available conventional combined heat and power systems (i.e. the prior art), an auxiliary fluid may be used to remove thermal energy (e.g. by transferring heat to the auxiliary fluid) from the engine systems that run at moderate to high temperatures. A moderate thermal energy source 122 of the engine 102 may be for example, a jacket of a piston engine or similar components. The heat energy recovered from the moderate-temperature thermal energy source 122 (i.e. medium-grade heat energy) or the high-temperature thermal energy source 120 (i.e. high-grade heat energy) may be transferred to the dynamically adaptive heat storage system 200 where the recovered thermal energy is either accumulated in any one of the available first and second thermal energy stores 202, 204, or provided directly to a consumer, such as, for example a campus or industrial process. In this particular example, the consumer is supplied with heat energy via a stream of working fluid 128 carrying the useful heat energy. Optionally, the medium-grade thermal energy from the moderate-temperature thermal energy source 122 may be rejected using a cooler 134, which may be a fin-fan cooler or any other suitable cooler apparatus.

Furthermore, as shown in FIG. 2, the consumer, i.e. campus or industrial process, may return a cooled working fluid 130 or comparable arrangement back to the combined heat and power (CHP) system 100. Where required/desired, the heat energy recovered from the exhaust gases 120 may be provided to the consumer as a high-grade thermal energy stream of steam or any other suitable working medium. In such cases, an additional separate circuit arrangement (not shown) may be provided to directly link the heat exchanger 110 to the consumer, e.g. a facility or a process.

Further referring to FIG. 2, the exhaust gases 120 rejected from the heat exchanger 110 may enter one or more secondary heat recovery units, such as, for example, the second heat exchanger 112. After extracting some more heat energy in heat exchanger 112, the gases are usually rejected into the atmosphere, possibly via one or more flues or chimneys 132. The secondary heat recovery unit, e.g. second heat exchanger 112, is depicted as a direct contact heat exchanger, but may be implemented as an indirect or hybrid heat exchanger or any other suitable recovery devices that, fully or partially, are capable of achieving the same heat recovery results. The heat energy recovered by the second heat exchanger 112 may be transferred to a part of the second thermal energy store 204 for temporary accumulation, or moved (i.e. upgraded) to a part of the first thermal energy store 202 utilising at least the first heat pump 116. The heat energy may also be moved to the consumer working fluid supply stream 128 using the first heat pump 116 as shown in FIG. 2.

It is further known from conventional CHP systems that, for example, some engines generate sources of low-temperature heat energy such as 124 (perhaps in the range 30° C. to 70° C.). As shown in the embodiment illustrated in FIG. 2, this so called low-grade heat energy may be transferred to the second thermal energy store 204 of the heat storage system 200, where it is moved (i.e. upgraded) to the first thermal energy store 202 or added to the working fluid stream 128 fed to the consumer using first heat pump 116. Optionally, the low-grade thermal energy may be rejected using a cooler 134, which may be a fin-fan cooler or any other suitable cooler apparatus.

As shown in FIG. 2, the CHP system of the present invention further allows the recovery of heat energy from the environment utilising at least a second heat pump 118. The second heat pump may be any one or any number of an air-source heat pump, a water-source heat pump, a ground-source heat pump or any other type of heat pump suitable to extract heat from the 'outdoors'. 'Outdoors' may be the environment or waste heat from another process or facility. The thermal energy extracted by the second heat pump 118 may either be stored in the second thermal energy store 204 for later use, or directly upgraded into the first thermal energy store 202 or the working fluid stream 128 utilising the first heat pump 116.

In addition, the CHP system 100 of the present invention optionally provides for additional fuel 136 and optional air 138 to be supplied to the first heat exchanger 110, where the fuel 136 and air 138 are combusted to increase the heat energy of the fluid that is supplied to the consumer or second heat exchanger 112. In combination with the heat recovery provided by the heat exchanger 110, the medium temperature heat source 122, low temperature heat source 124, second heat exchanger 112, the heat pumps 116 and 118, this so called supplementary firing will increase the heat-to-power ratio well beyond the capabilities of a conventional CHP system.

An example embodiment of the dynamically adaptive heat storage system 200 is now described in more detail with reference to FIGS. 3 to 10, which illustrate the possible operating modes of the heat storage system 200.

Figure 3:
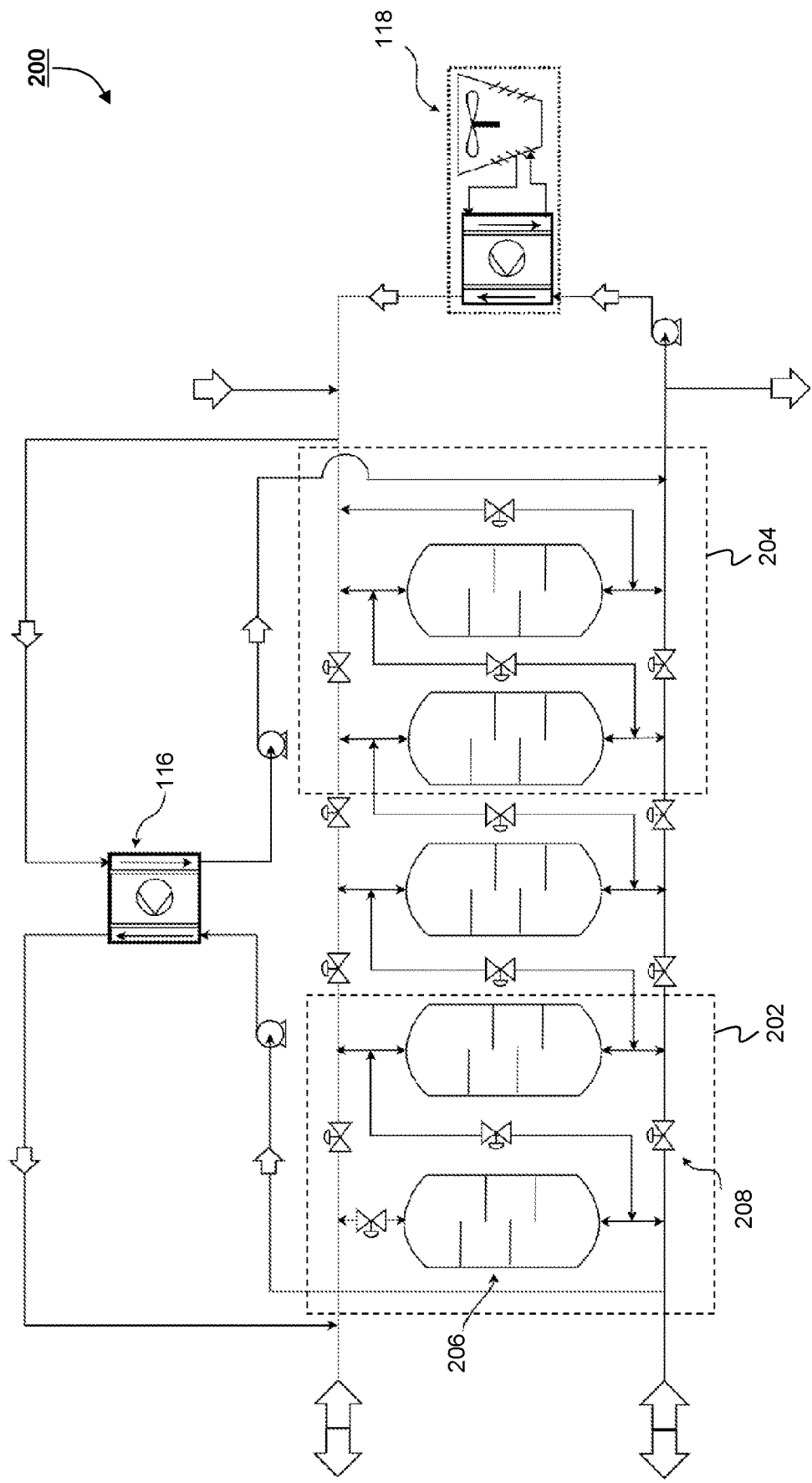
FIG. 3 shows a detailed schematic illustration of an example of the dynamically adaptive heat storage system of the CHP system of the present invention, comprising five thermal energy storage units, each optionally having multiple internal divisions.

FIG. 3 discloses an embodiment of the dynamically adaptive heat storage system 200 comprising the selectively variable first thermal energy store 202. The example embodiment in FIG. 3 showing the first thermal energy store is formed selectively, variably and dynamically from two storage units 206, (illustrated by dotted line 202). The second thermal energy store (illustrated by dotted line 204) is also selectively, variably and dynamically formed from two storage units 206. Each one of the first and second thermal energy store 202, 204 may be formed by one or more operatively coupleable modular storage units 206. In particular, the dynamically adaptive heat storage system 200 is adapted to form each of the first and second thermal energy store 202, 204 by selectively allocating (and fluidly coupling) one or more of the available modular storage units 206 to respective said first and second thermal energy store 202, 204. Each one of the modular storage units 206 may have multiple internal divisions so as to provide storage sections for the working fluid at different temperatures. It is understood that any number of modular storage units 206 may be allocated to any one of the first and second thermal energy store 202, 204, depending on the requirement of the CHP system 100. It is also understood that the internal design of storage units 206 may vary and be designed to maximise the efficiency and/or operability of the thermal storage system 200.

The embodiment illustrated in FIG. 3 depicts five storage units 206 (e.g. tanks), but more or less storage units 206 may be provided. Storage units may incorporate phase change materials or other enhancements where this is considered beneficial. Pipework for the fluid circuit is arranged so as to fluidly couple respective components of the heat storage system 200 and to allow the working fluid (e.g. water) to be moved in and out of the storage units 206, or around so as to bypass any one or all of the thermal energy stores 202, 204. This allows thermal energy to be selectively accumulated, discharged or moved, according to the system requirements conducive to best optimising the CHP system 100. A suitable storage capacity of each of the first and second thermal energy store 202, 204 is achieved by actuating respective control valves 208, or similar flow control devices, so as to open or close a predetermined fluid path, therefore including or excluding a storage unit 206 to any one of the first and second thermal energy store 202, 204.

Figure 4:
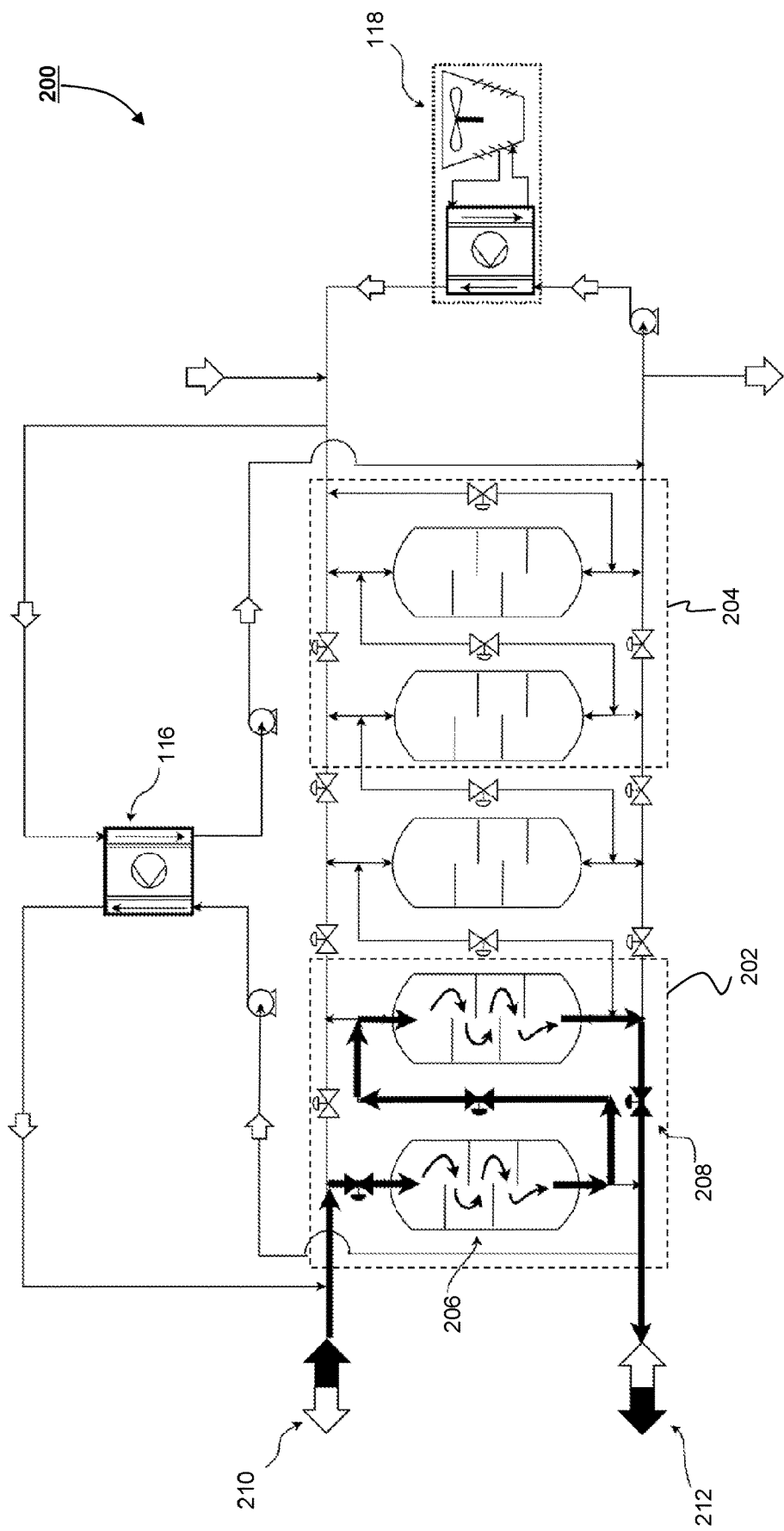
FIG. 4 shows the dynamically adaptive heat storage system of FIG. 3 operating in a high-grade heat accumulation mode.

FIG. 4 shows an example where the heat storage system 200 is operated in a high-grade heat accumulation mode. Here, hot working fluid (e.g. water) may be provided at a connection 210 (see FIG. 4) and circulated back through the storage units 206 as illustrated by the thick, black arrows. In return for providing hot fluid at connection 210, a colder fluid may then be returned to the CHP system 100 at a connection 212. In the case depicted in FIG. 4, two storage units 206 have been selected to be engaged in the heat accumulation process, but subject to system strategy (i.e. as processed by a controller), one or three or more storage units 206 may be selected. In this particular example, two storage units 206 are therefore considered to form the first thermal energy store 202. This configuration mode with one, two or more storage units 206 may be applied when excess or surplus heat was generated for whatever reason.

Figure 5:
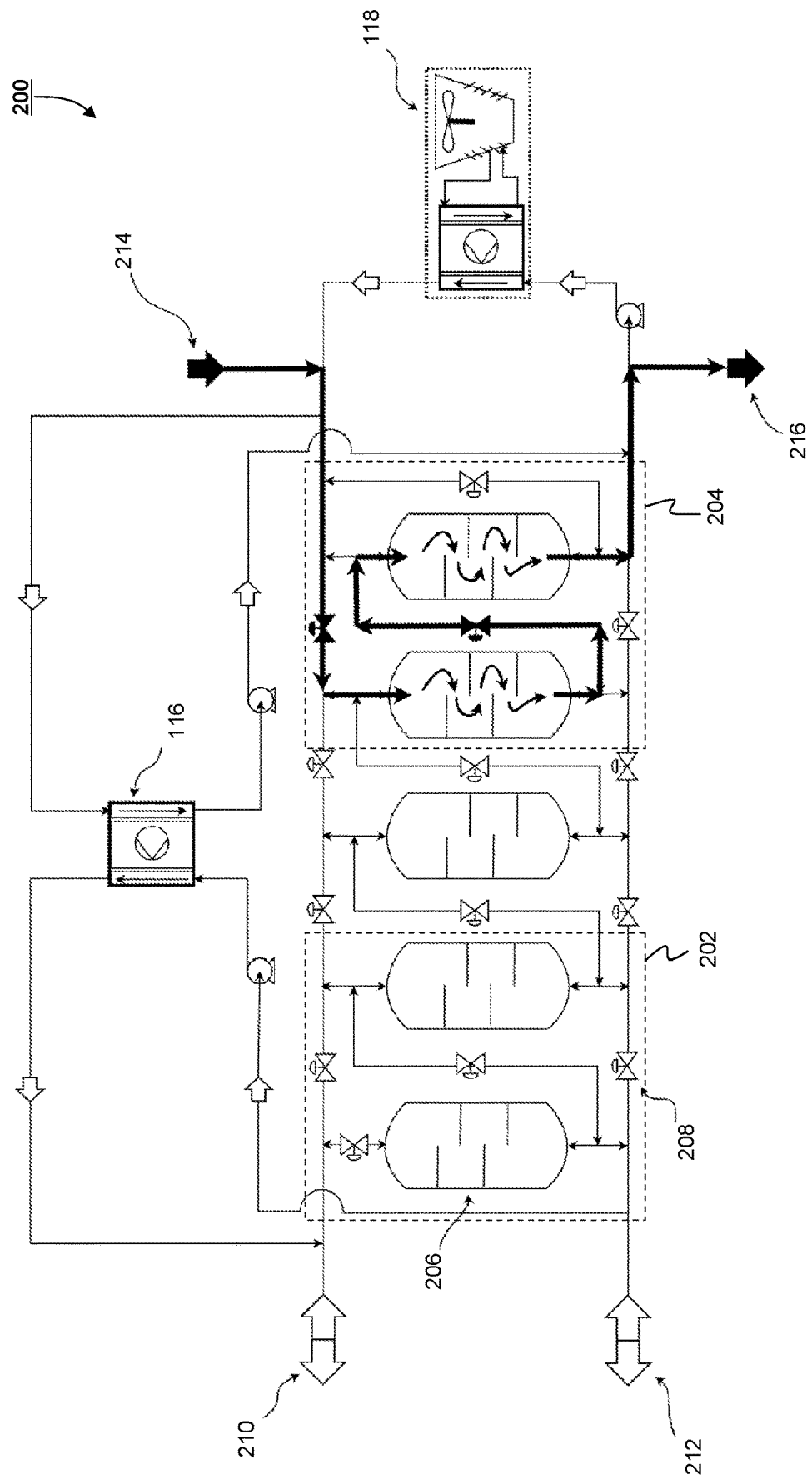
FIG. 5 shows the dynamically adaptive heat storage system of FIG. 3 operating in a low-grade heat accumulation mode utilising two serially coupled thermal energy storage units.

Referring to FIG. 5, a working fluid or other medium (e.g. from the CHP system 100) carrying low-grade heat energy may be transferred to the heat storage system 200 via a connection 214. In return for providing the low-grade heat energy fluid into the second thermal energy store 204, a fluid at a lower temperature than that provided via the connection 214 is displaced from the storage unit(s) 206 at a connection 216. In this low-grade heat energy accumulation mode, part of the heat storage system 200, i.e. the second thermal energy store 204, is accumulating or storing low-grade heat energy (typically but not exclusively in the range 30° C. to 70° C.)). Here, two storage units 206 are depicted as being engaged in this process, thereby forming the second thermal energy store 204. However, as with the first thermal energy store 202, and as illustrated in FIG. 6 (utilising only one storage unit 206), any one and any available number of modular storage units 206 may be engaged.

Figure 6:
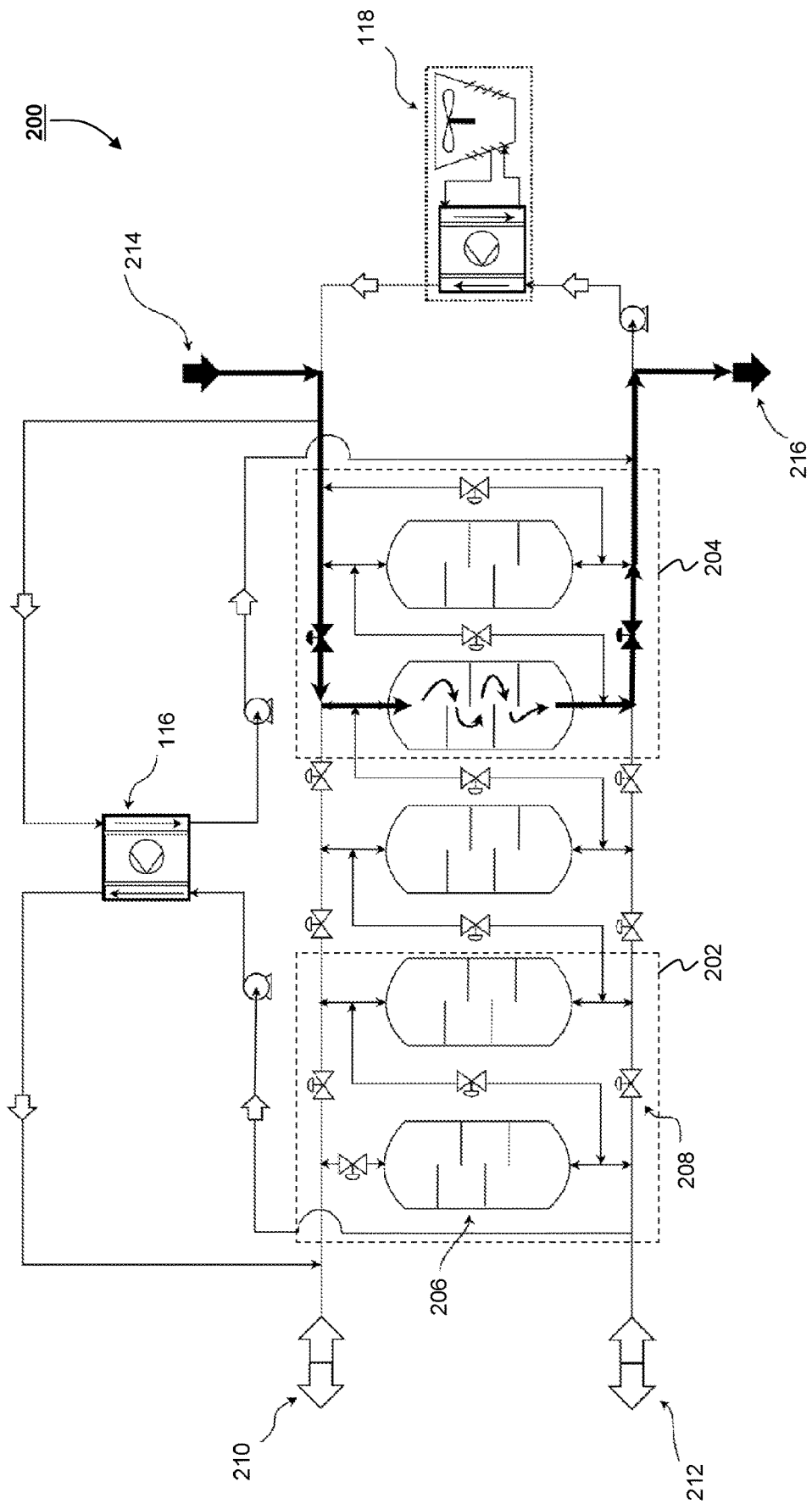
FIG. 6 shows the dynamically adaptive heat storage system of FIG. 5 operating in a low-grade heat accumulation mode utilising one thermal energy storage unit.
Figure 7:
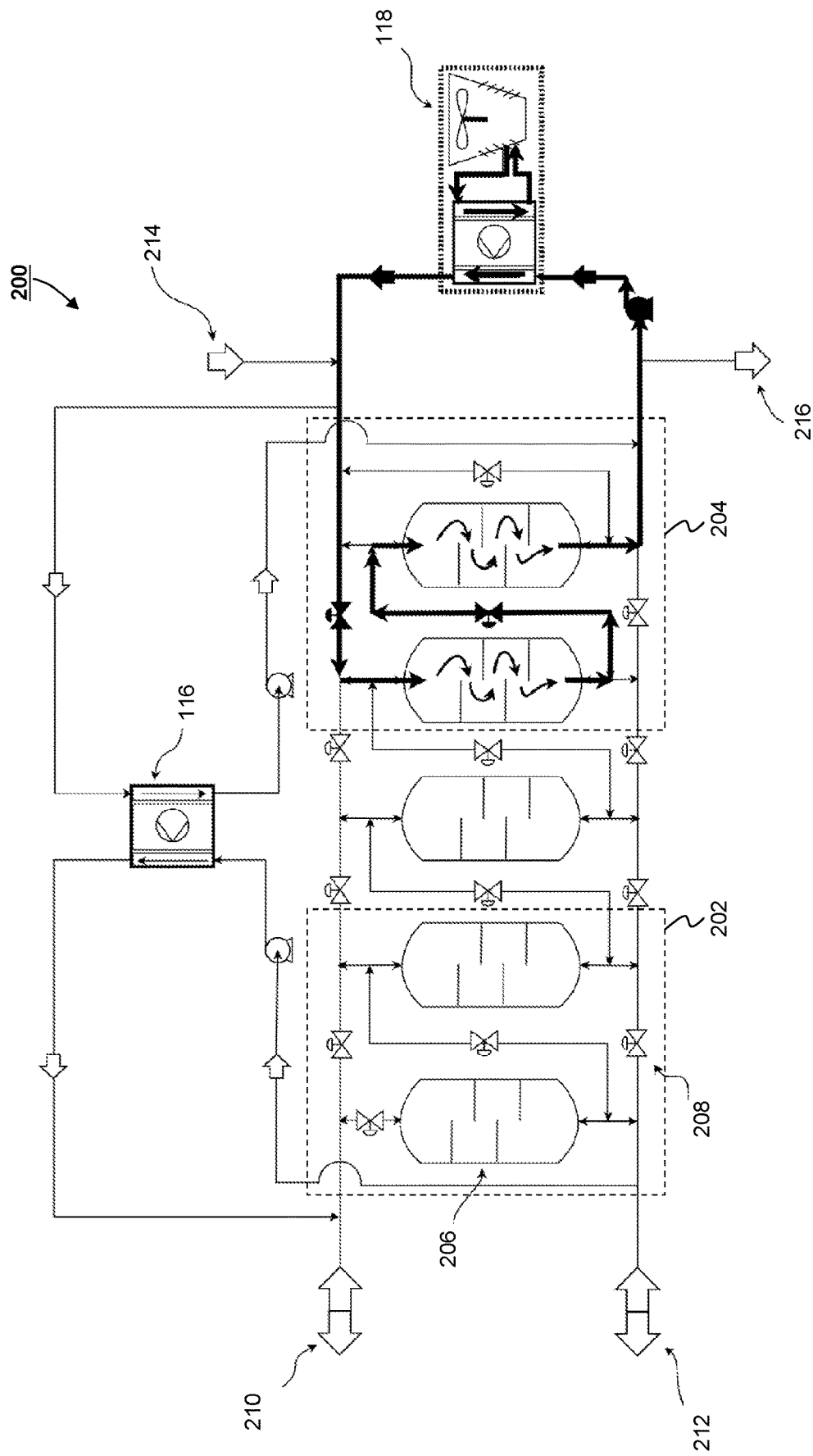
FIG. 7 shows the dynamically adaptive heat storage system of FIG. 3 operating in a low-grade heat accumulation mode utilising two serially coupled thermal energy storage units, wherein low-grade heat energy recovered form an air-source heat pump is added to the system.

FIG. 7 illustrates the heat storage system 200 in an operation mode that is similar to that described in FIG. 5 or 6. However, the low-grade thermal energy source is provided by an air-source heat pump 118. Again, any suitable heat pump type may be used, such as, for example, a water-source heat pump, a ground-source heat pump or any other type of heat pump. Alternatively or additionally, the thermal energy may equally be obtained from low-grade heat energy from another external process.

Figure 8:
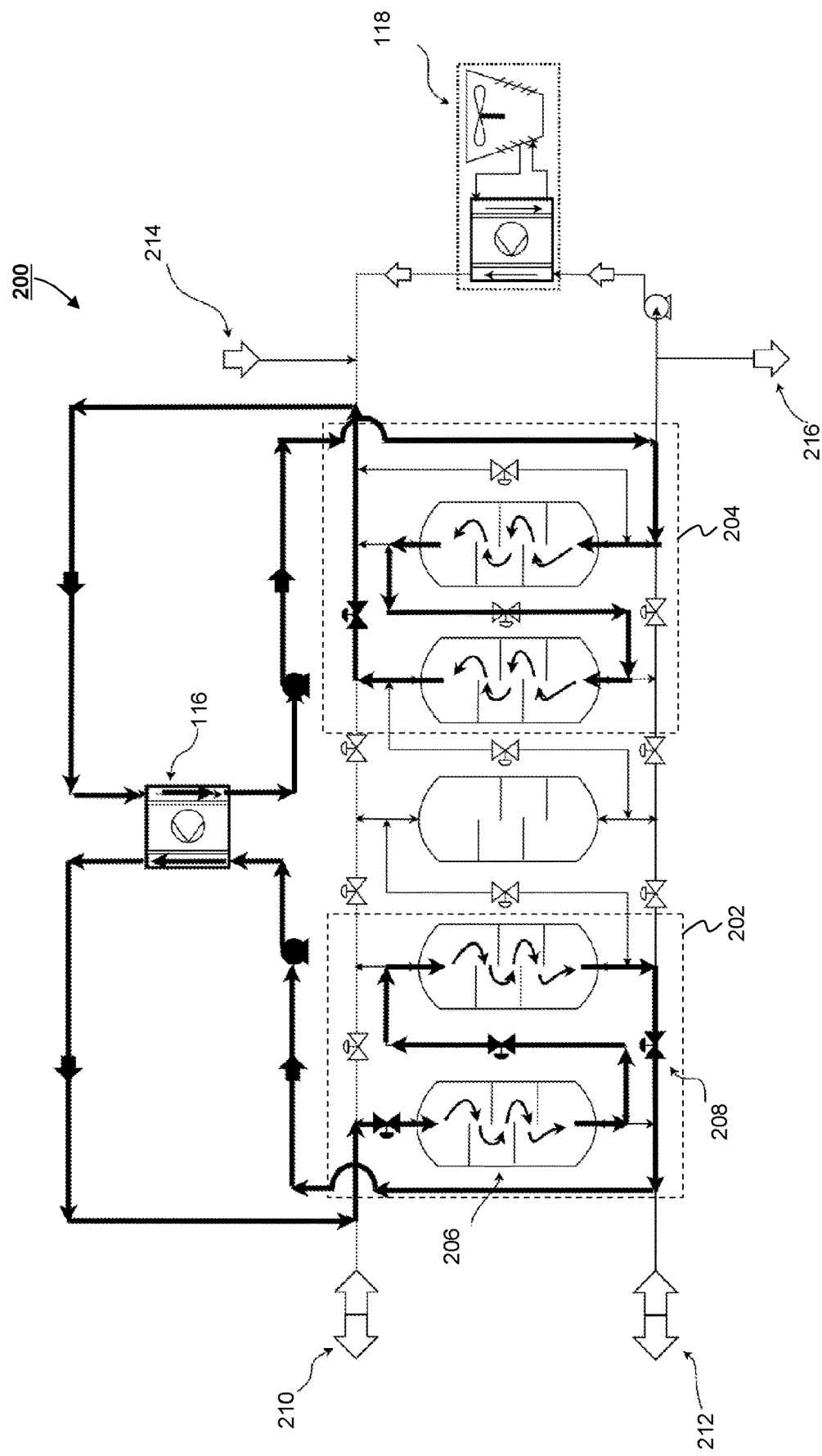
FIG. 8 shows the dynamically adaptive heat storage system of FIG. 3, wherein low-grade heat contained in the two engaged thermal energy storage units is upgraded using another heat pump.

FIG. 8 illustrates an operating mode where low-grade heat energy stored in the two storage units 206 of the second thermal energy store 204 are upgraded and passed to the first thermal energy store 202 utilising the first heat pump 116. At the higher temperature part of the heat storage system 200, i.e. the first thermal energy store 202, and the lower temperature part of the heat storage system 200, i.e. the second thermal energy store 204, two storage units 206 are engaged in each respectively. However, it is understood, that any suitable number of storage units 206 may be allocated to said first and second thermal energy store 202, 204.

Figure 9:
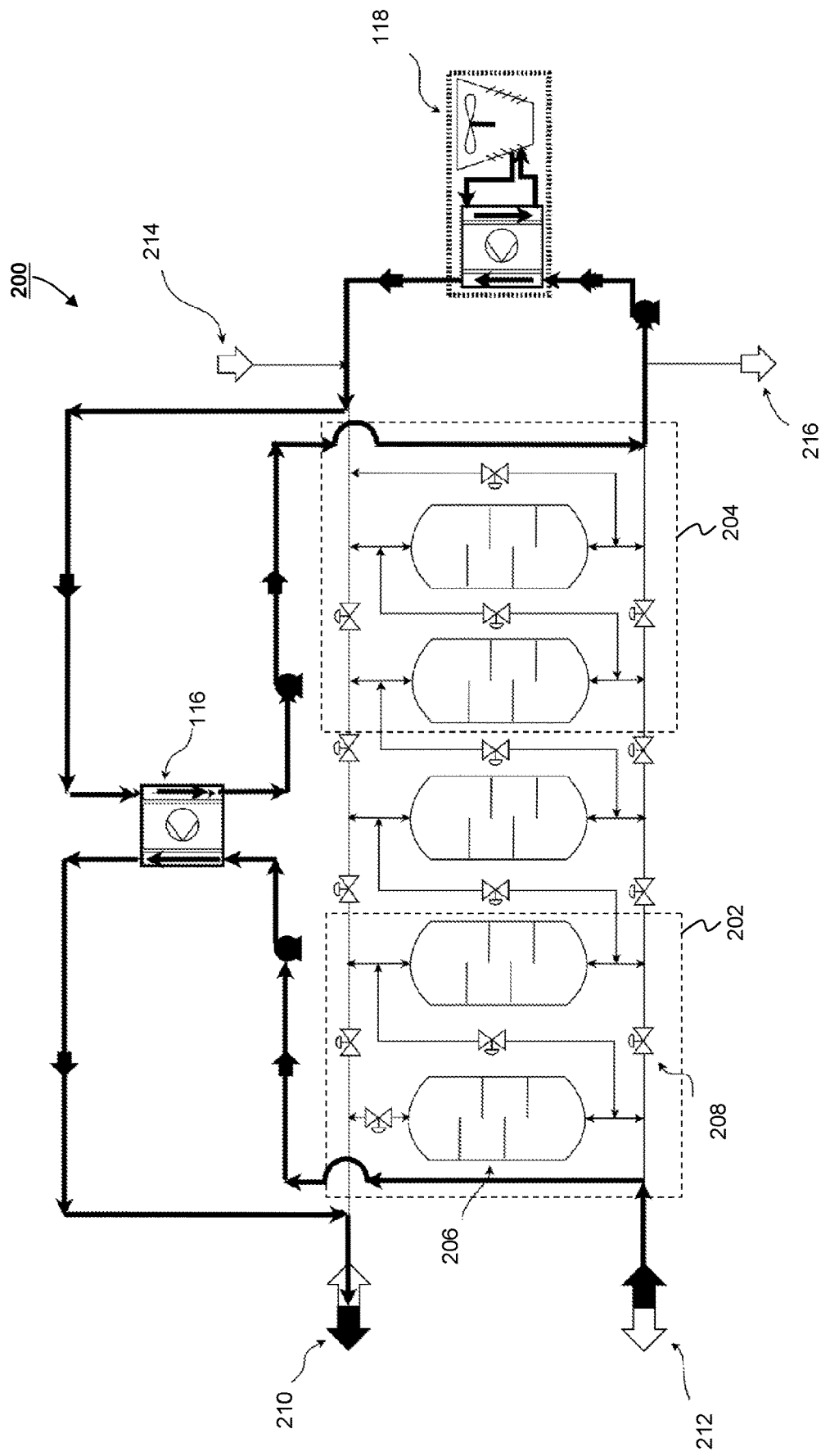
FIG. 9 shows a mode of operation where the dynamically adaptive heat storage system is bypassed and a source of low-grade heat from an air-source heat pump is upgraded using another heat pump that then supplies high-grade heat directly to the consumer.

In the operation mode shown in FIG. 9, the heat storage system 200 is bypassed. In this mode, heat from a low-grade heat energy source (e.g. air-source heat pump 118) is upgraded using the first heat pump 116, which then provides the high-grade heat directly to the consumer.

Figure 10:
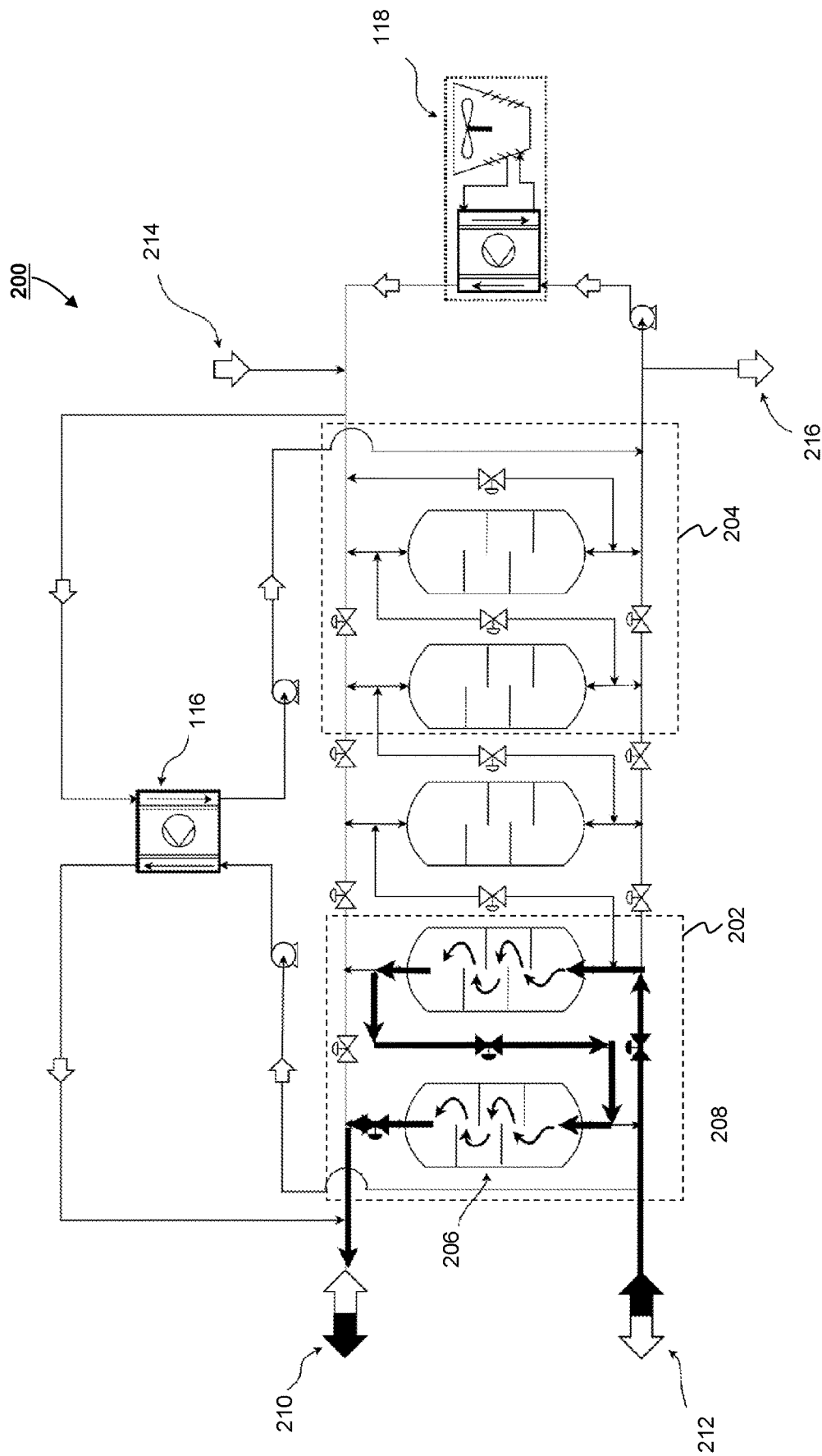
FIG. 10 shows the dynamically adaptive heat storage system of FIG. 3, where a lower-temperature stream of auxiliary fluid is provided to the dynamically adaptive heat storage system in return for a higher-temperature stream of auxiliary fluid stored in two of the thermal energy storage units

Alternatively, and as illustrated in FIG. 10, the heat storage system 200 is provided with a reduced-temperature stream of fluid via a connection 212 (connection 212 is now acting in reverse as an inlet) in return for a higher-temperature stream of fluid via connection 210 (connection 210 is also now acting in reverse as an outlet). Again, according to the current optimisation requirements of the CHP system 100, any number of modular storage units 206 may be allocated to said first and second thermal energy stores 202, 204.

It is understood by the person skilled in the art that any combination or blended combinations of the operating modes of the dynamically adaptive heat storage system 200 (as illustrated in FIGS. 3 to 10) may be selected in conjunction with feasible configurations of the CHP system 100 (see FIG. 2). The possible operating modes may include scenarios where the engine(s) 102 is/are part-loaded or shut down and electricity is imported from a suitably available external supply or a grid connection, in order to power any one or any number of the CHP system 100 components, i.e. the pumps 140, heat pumps 116, 118 and auxiliary system, should that be required or desirable.

Figure 11:
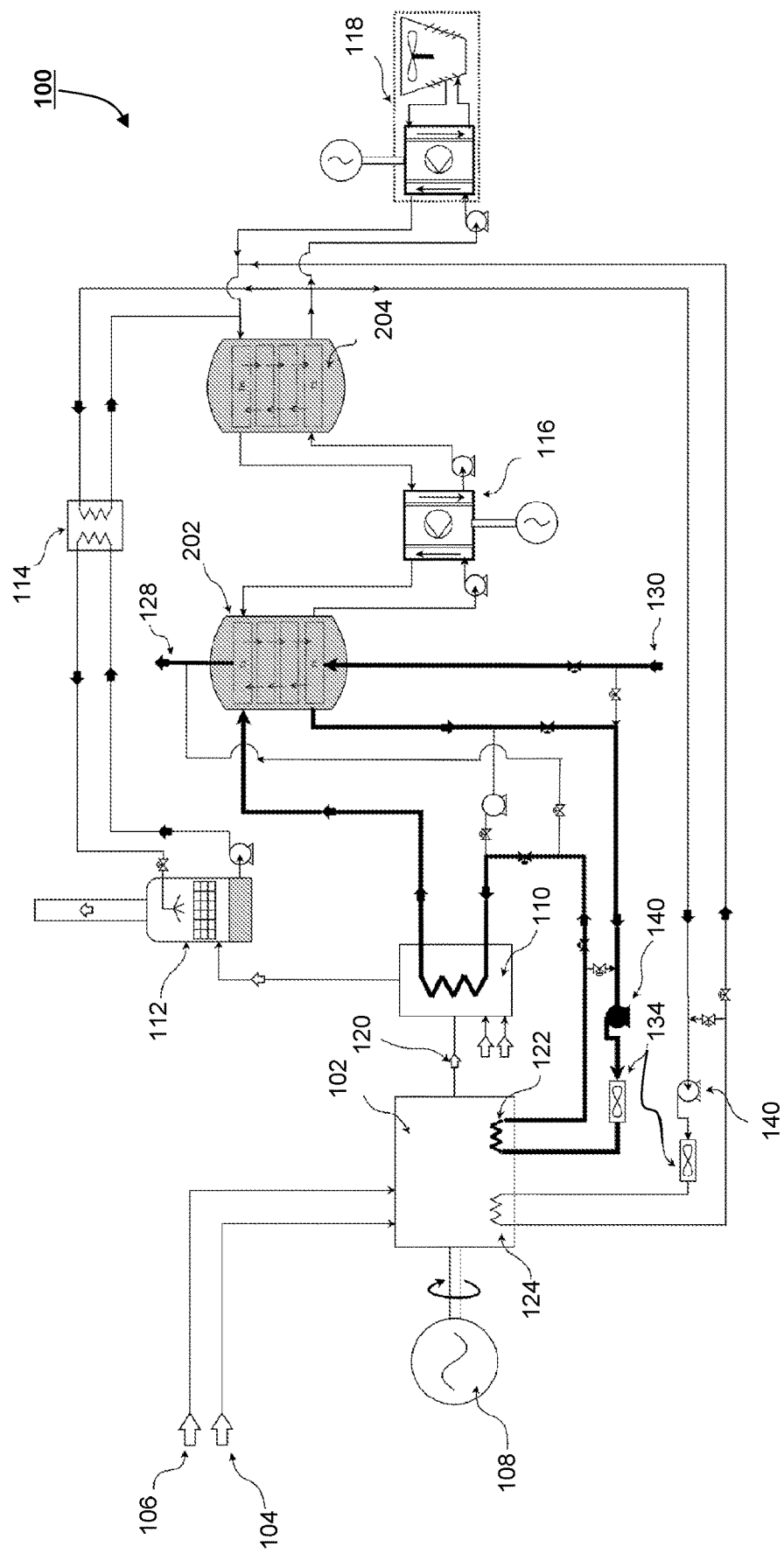
FIG. 11 shows the CHP system of FIG. 2 in a first operating mode, where heat energy is recovered from the high-grade (exhaust gas) and medium-grade (engine jacket) thermal energy source, and supplied in series to the consumer via the heat store.

Referring now to FIG. 11, an example embodiment of the CHP system 100 is shown in operation, where medium-grade (or high-grade) heat energy is recovered from the engine jacket (moderate thermal-energy source 122) or any other medium temperature source, and operated in series with the heat recovery from the exhaust 120. The heat energy is supplied to the consumer, i.e. the campus, facility or secondary process, with a lower-temperature working fluid 130 being returned to the CHP system 100. In cases where the heat production from the CHP system 100 exceeds the demand of the consumer, i.e. facility or campus, this would place the heat storage system 200 in accumulation mode (potentially as illustrated by example in FIG. 4). The accumulation may continue until the temperature at cooler 134 begins to exceed a predetermined temperature threshold (e.g. a maximum temperature of the cooled working fluid returned to the jacket of the engine 102). The temperature threshold of the working fluid may be reached, when the working fluid exiting the heat storage system 200 rises to and above the temperature allowed by the engine 102. At this point, an additional storage unit 206 with a lower-temperature working fluid may be included into the circuit to lower the working fluid temperature.

Figure 12:
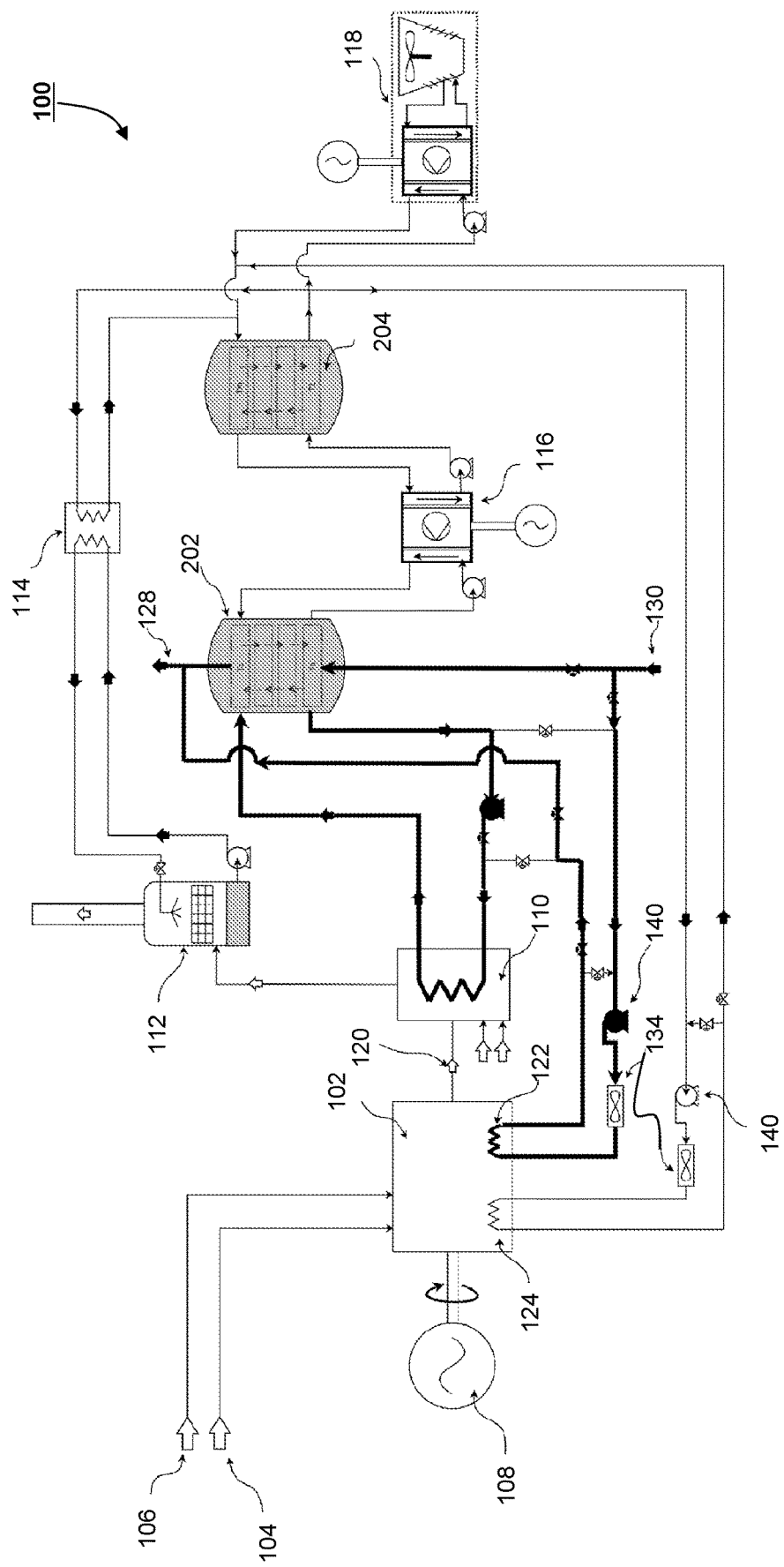
FIG. 12 shows the CHP system of FIG. 2 in a second operating mode, where high-grade heat is accumulated in the active thermal energy storage units and medium-grade heat energy is supplied directly to the consumer in order to meet the consumer's heat demand.

In case it is not possible (or desirable) to include a lower-temperature storage unit 206 (e.g. all available storage units 206 have been used, or some low-temperature storage units must be retained for the accumulation of low-grade heat), the CHP system 100 may be reconfigured as illustrated in FIG. 12. Here, heat energy recovered from the moderate thermal energy source 122 of the engine 102 (cooling of the engine jacket) is coupled and transferred directly to the consumer (e.g. facility, campus) to meet some or all of the demand. Any excess of the heat energy recovered from the moderate thermal energy source 122 of the engine 102 that could not be supplied to the consumer might be rejected by operating cooler 134.

On the other hand, any shortfall in the heat energy available from the moderate thermal energy source 122 of the engine 102 may be supplied by the heat storage system 200. Thus, heat energy recovered from the engine exhaust 120 would continue to be accumulated into the heat storage system 200. The temperature of the working fluid circulated between the storage units 206 and the first heat exchanger 110 would be increased as far as is practically possible. The temperature of storage units 206 forming the first thermal energy store engaged in the storage of energy from heat exchanger 110 would also increase. It may be highly advantageous to use phase change materials in the storage units 206 of the first thermal store 202 (in this mode of operation where storage units 206 are being heated to an elevated temperature).

Figure 13:
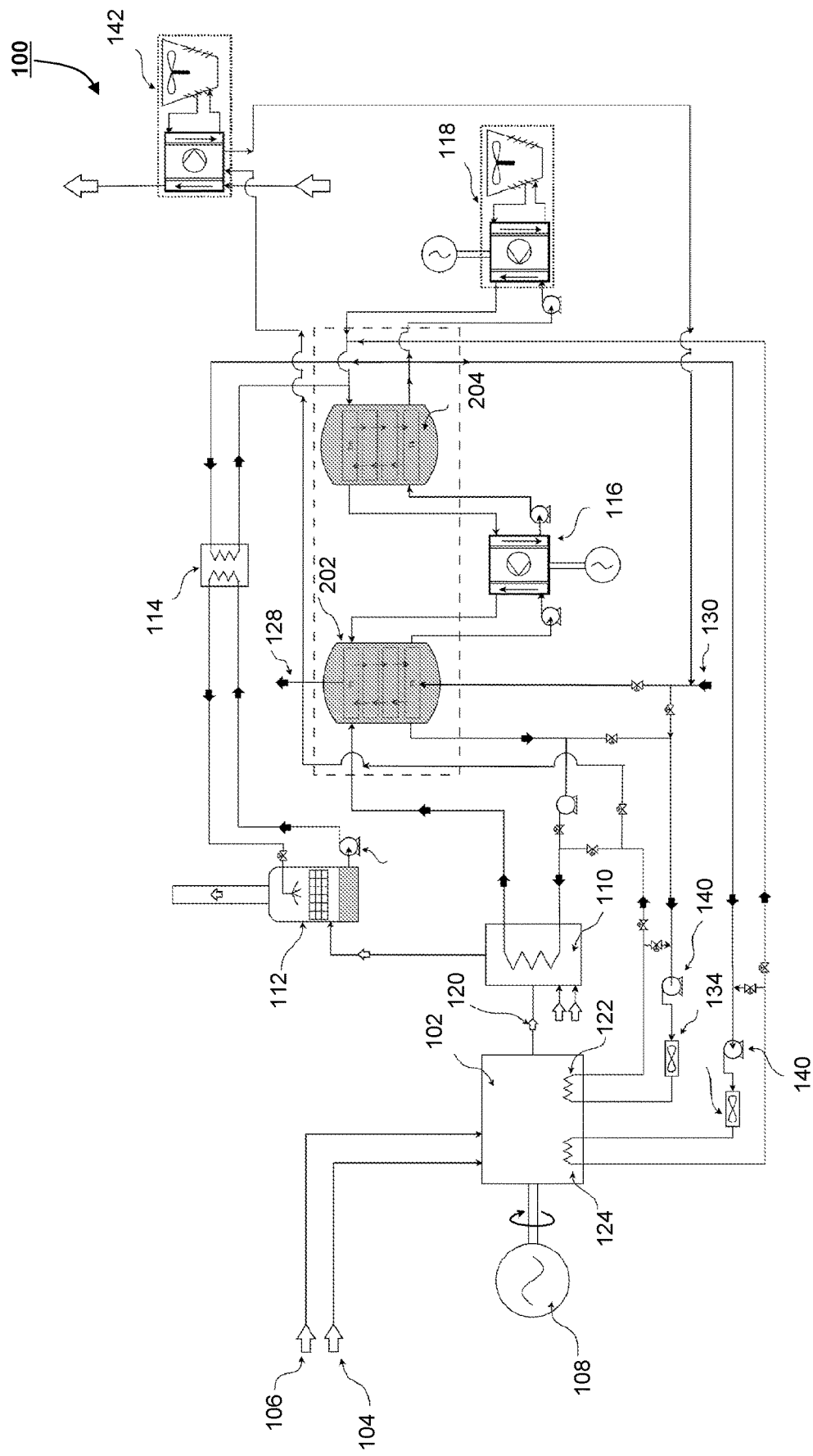
FIG. 13 shows a different embodiment of the CHP system of the present invention, including a thermally driven chilling system coupled to the medium-grade heat energy recovery circuit.

FIG. 13 shows another embodiment where the CHP system 100 is connected to a thermally driven chilling system 142.

The overall fuel efficiency of the CHP system 100 of the present invention may be over 130% and even up to 160%, based on the useful energy supplied (power and heat) relative to the fuel heat input, at heat-to-power ratios of '6 to 1' or even greater. In a typical application of the CHP system 100, and if the average ratio of the demand for heat and power is '3 to 1', then the efficiency of the CHP system 100 may be 110% or greater, for example up to 130%, based on the useful energy supplied (power and heat) relative to the fuel heat input. In other applications, e.g. where the average heat to power ratio is '2 to 1', the fuel efficiency based on useful energy supplied (power and fuel) relative to the fuel energy may be over 105% and up to and perhaps over 115%.

Consequently, during operation at any heat-to-power ratio and output level within the capabilities of the proposed CHP system 100, (i) increasing or reducing heat pump production or (ii) switching the heat pump units on or off, in conjunction with (iii) increasing engine output or decreasing engine output, or (iv) starting or stopping engines or (v) varying the input or output of the dynamically adaptive heat storage system provides exceptional capability to produce an incremental amount of net-power output for export to a grid or electrical network, or incremental amount of net heat for a secondary system (e.g. a campus) for a very small incremental amount of fuel (thus high marginal efficiency).

Peaking power produced in this way could therefore be twice or three times or even more times greater than the net-electrical output of the CHP system 100. The efficiency of this incremental component of power produced by the CHP system 100 would be very high compared with many alternative means of generating peaking power. The effective efficiency of this proportion of power might be 60% or more.

Equally the CHP system 100 of the present invention may occasionally import a substantial amount of electrical power to be used with the heat pumps 116, 118, 142. The ability to produce high-efficiency peak electricity output and, alternatively, to reduce output and import power, means that the proposed CHP system 100 is capable of providing excellent balancing capabilities for renewable energy systems, such as wind or solar power systems. The proposed CHP system 100, with dynamically adaptive thermal energy storage, maximises the efficiency and utilisation of renewable energy and meets peak energy demands in an extremely efficient way.

It is understood that the CHP system 100 or heat storage system 200 may utilise any suitable controller or controller system to control the control valves, pumps, coolers, fuel and air supply, as well as, heat and power supplementation or release. Automated or computer operated control mechanism for CHP systems are known in the art and are therefore not described in any more detail. Furthermore, external information, such as current fuel prices, cost of heat energy and electricity, and/or current demand of heat and electricity may be received and processed by the controller, so as to optimise the overall efficiency of the CHP system, or economic performance, not only according to fuel efficiency, but also according to the overall running costs. Alternatively, the controller may be adapted to generate a predictive model for energy demand and/or energy costs based on historic data (e.g. fluctuation of energy demand and respective energy costs over a whole year), and apply the generated model in conjunction with current data of energy demand and costs (e.g. received in real-time).

It will be appreciated by persons skilled in the art that the above embodiment(s) have been described by way of example only and not in any limitative sense, and that various alterations and modifications are possible without departing from the scope of the invention as defined by the appended claims.

What is claimed is:

1. A combined heat and power system, comprising:
   at least one engine, operatively coupled to a generator, having at least one first heat source adapted to provide a first thermal energy output at a first temperature range, and at least one second heat source adapted to provide a second thermal energy output at a second temperature range;
   at least one first heat exchanger, operatively coupled to said at least one engine, and adapted to selectively receive and transfer at least a portion of any one or all of said first thermal energy output and said at least one second thermal energy output; and
   a dynamically adaptive heat storage system, comprising:
      a selectively variable first thermal energy store device, adapted to accept, store and discharge thermal energy at said first temperature range;
      at least one selectively variable second thermal energy store device, adapted to accept, store and discharge thermal energy at said second temperature range;

at least one first heat pump, operatively coupled to said first thermal energy store device and said at least one second thermal energy store device, and which is adapted to transfer and thermally upgrade the thermal energy stored in said at least one second thermal energy store device to said first thermal energy store device, wherein said at least one first heat pump is adapted to receive power from said generator, and a system controller, adapted to selectively engage any one or all of said at least first heat source and said at least one second heat source and control the amount of thermal energy that is stored, upgraded or discharged, so as to optimize the energy efficiency of said combined heat and power system.

2. A combined heat and power system according to claim 1, wherein said at least one engine further comprises at least one third heat source adapted to provide a third thermal energy output at a third temperature range different to the first temperature range and the second temperate range.

3. A combined heat and power system according to claim 2, wherein said at least one first heat source is a high-grade heat source, said at least one second heat source is a low-grade heat source, and said at least one third heat source is either a medium-grade or high-grade heat source.

4. A combined heat and power system according to claim 2, wherein said system controller is further adapted to control the amount of any one of said first thermal energy output and/or said third thermal energy output that is bypassed directly to a consumer.

5. A combined heat and power system according to claim 1, wherein said selectively variable first thermal energy store device and said selectively variable second thermal energy store device are formed by a plurality of operatively coupleable modular storage units.

6. A combined heat and power system according to claim 5, wherein the capacity of each one of said first and second thermal energy store device is selectively variable by allocating a predetermined number of said plurality of operatively coupleable modular storage units to each of said first and second thermal energy store device.

7. A combined heat and power system according to claim 1, further comprising a plurality of control valves, each individually actuatable by said system controller between an open state and a closed state.

8. A combined heat and power system according to claim 1, wherein said at least one first heat exchanger is adapted to thermally supplement or upgrade any one of said first and second thermal energy output.

9. A combined heat and power system according to claim 1, further comprising at least one second heat exchanger operatively coupled to and arranged downstream from said at least one first heat exchanger.

10. A combined heat and power system according to claim 9, wherein said at least one second heat exchanger is adapted to transfer thermal energy to said at least one selectively variable second thermal energy store device.

11. A combined heat and power system according to claim 10, wherein said at least one second heat exchanger is operatively coupled to said at least one selectively variable second thermal energy store device via a third heat exchanger.

12. A combined heat and power system according to claim 1, further comprising at least one second heat pump operatively coupled to said at least one selectively variable second thermal energy store device and adapted to thermally upgrade thermal energy stored in said at least one selectively variable second thermal energy store device.

13. A combined heat and power system according to claim 12, wherein said at least one second heat pump is the air-source heat pump.

14. A combined heat and power system according to claim 13, wherein said at least one second heat pump is adapted to receive power from said generator.

15. A combined heat and power system according to claim 1, wherein said system controller is adapted to utilize external information in order to operate said combined heat and power system and/or configure said dynamically adaptive heat storage system, so as to optimize the overall efficiency of said combined heat and power system.

16. A combined heat and power system according to claim 15, wherein said external information comprises historical data or current data.

17. A combined heat and power system according to claim 15, wherein said external information comprises any one or all of a real-time or predictive energy demand from a consumer and real-time or predicted energy costs of the economic market.

* * * * *